J. A. BECHER.
DIE STOCK.
APPLICATION FILED MAR. 16, 1909.
991,687.
Patented May 9, 1911.
2 SHEETS—SHEET 1.
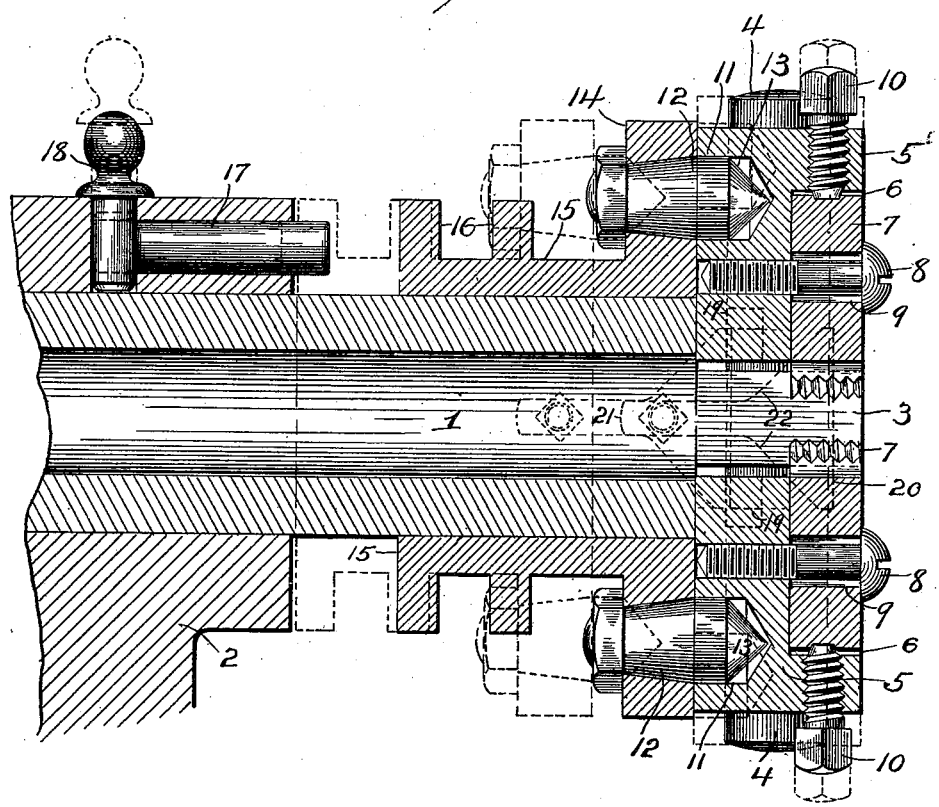

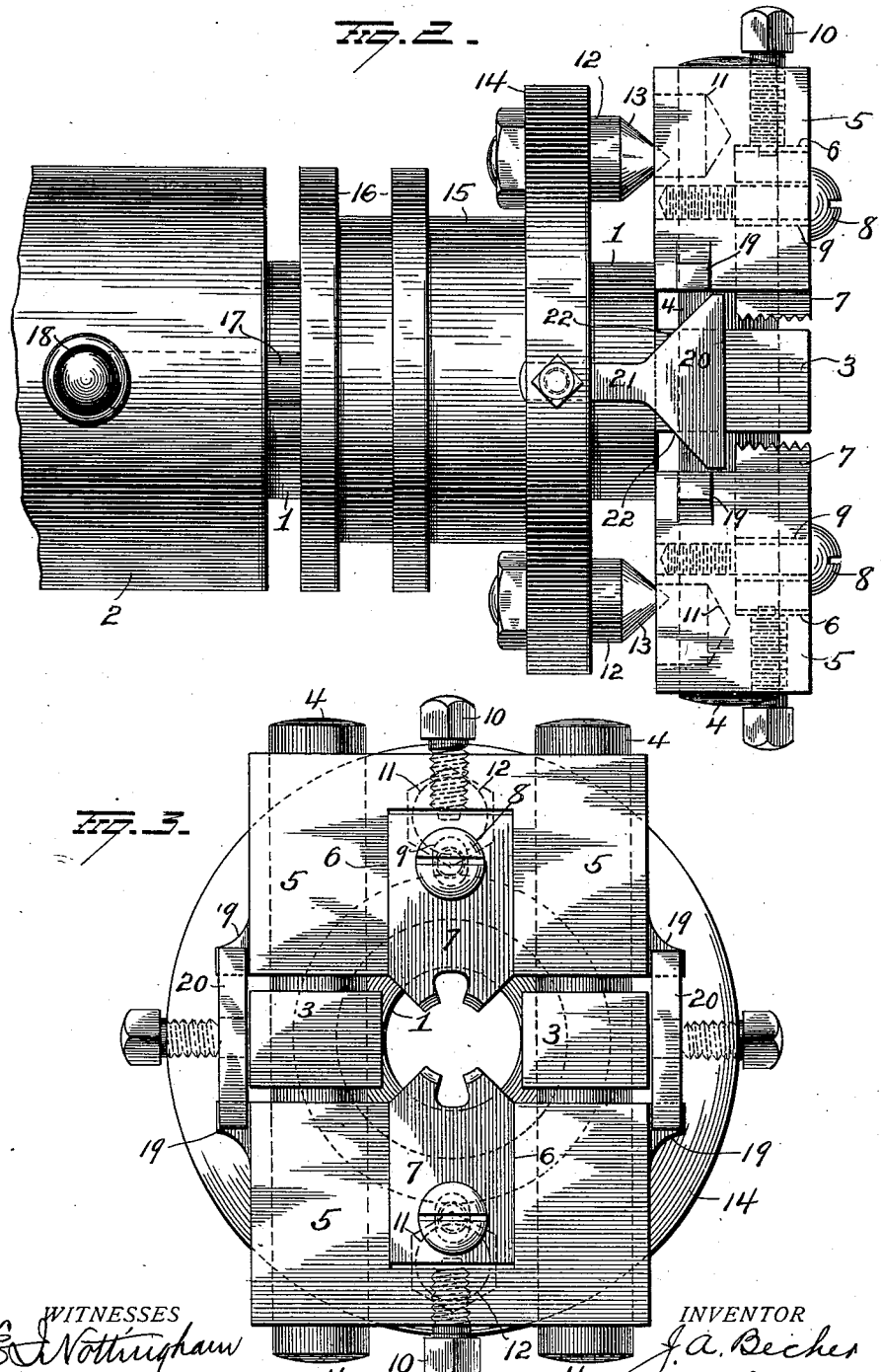

UNITED STATES PATENT OFFICE.

JAMES A. BECHER, OF CHICAGO, ILLINOIS.

DIE-STOCK.

991,687. Specification of Letters Patent. Patented May 9, 1911.

Application filed March 16, 1909. Serial No. 483,813.

*To all whom it may concern:*

Be it known that I, JAMES A. BECHER, of Chicago, in the county of Cook and State of Illinois, have invented certain new and useful Improvements in Die-Stocks; and I do hereby declare the following to be a full, clear, and exact description of the invention, such as will enable others skilled in the art to which it appertains to make and use the same.

This invention relates to improvements in die stocks,—one object of the invention being to simplify and reduce the cost of construction of die stocks of the type to which my invention relates.

A further object is to so construct the die stock that the carriers for the dies or cutters can be readily and quickly removed, and others substituted with dies or cutters properly set to accomplish the work for which they are intended, thus obviating the tedious process of cutting, trying and adjusting the dies or cutters after they have been placed on the assembled stock.

With these objects in view the invention consists in certain novel features of construction and combinations of parts as hereinafter more fully described and pointed out in the claims.

In the accompanying drawings, Figure 1 is a longitudinal sectional view illustrating a die stock embodying my improvement. Fig. 2 is a side elevation, and Fig. 3 is a face view.

1 represents a tubular arbor or shaft suitably mounted in the frame 2 and adapted to be driven by any suitable means not shown. The arbor 1 is provided with forward projections or arms 3 which are integral with said arbor and disposed diametrically opposite each other. Parallel guide bars 4 are secured between their ends to the respective projections 3 so as to be disposed at right angles to the axis of the arbor and at respective sides of the bore of the latter. On these guide bars, die carriers 5 are movably mounted and each die carrier is provided with a recess 6 in which a die or cutter 7 is secured by means of a screw 8. Each die or cutter is provided with an elongated hole 9 for the passage of the screw 8 to permit adjustment of the die or cutter in the carrier. The dies or cutters will be held in the positions to which they may be adjusted and end thrust will be sustained by means of screws 10 passing through the end walls of the carriers and engaging the butt ends of the dies or cutters. The carriers 9 are provided in their rear faces with sockets 11 for the reception of pins 12 having cone or wedge ends 13. The pins 12 are carried by an annular flange 14 which is integral with one end of a sheave 15 mounted to slide on the arbor 1 and said sheave is provided with a groove 16 for the reception of a shifting lever not shown. The sheave 15 is capable of sufficient rearward movement to permit the pins 12 to be fully withdrawn from the sockets 11 in the carriers so as to permit said carriers to be moved off of the guide-bars 4.

The dies are first secured in the carriers and the carriers are then placed in their positions in the stock and then they are tried and adjusted to the size that they will be required to cut and after they are once adjusted they will retain their exact cutting size regardless of the number of times they are removed from and replaced on the stock. When the carriers, with the dies or cutters secured thereto, shall have been placed upon the guide-bars 4, the forward movement of the sheave 15 will cause the cone or wedge ends 13 of the pins 12 to engage walls of the sockets 11 in the carriers and cause the latter to be moved toward each other and to assume their working position.

It is frequently desirable to open the die stock by moving the carriers apart without permitting them to be moved entirely from the guide-bars 4. To accomplish this a stop pin 17 is mounted on the frame 2 and will be held in its projected position by means of a pin 18. The pin 17 will prevent the sheave 15 from being moved rearwardly a sufficient extent to entirely withdraw the pins 12 from the sockets 11 and hence, when in this position, the pins 12 will prevent the removal of the carriers 5 from the guide-bars 4. When it is desired to remove the carriers from the guide-bars, the pin 18 will be withdrawn to permit the stop pin 17 to move rearwardly and the sheave 15 to move to the end of its throw against the frame 2, when the pins 12 will have been fully withdrawn from the sockets 11 in the carriers.

Each carrier 5 is provided at diametrically opposite sides with lugs 19 and between the lugs of the respective carriers, triangular blocks or openers 20 are disposed and provided with arms 21 attached at their rear ends to the flange 14 of the sheave 15. With this construction it will be seen that when the sheave 15 is moved rearwardly, the beveled side edges 22 of the blocks 20, engaging the lugs 19 of the respective carriers, will cause said carriers to be moved outwardly in opposite directions and thus the stock will be opened to move the cutters from the work. Should the sheave be moved quickly, the momentum of the carriers during their outward movement, would cause the lugs 19 to move entirely out of the path of the blocks 20, as shown in Fig. 2,— but the escape of the carriers from the guides would be prevented by the pins 12.

Various slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is,—

1. The combination with an arbor, die carriers movably mounted thereon, and a sheave mounted to slide on the arbor, of blocks carried by the sheave intermediate of the die carriers, each of said blocks having its side edges beveled to coöperate with the die carriers to separate them when the sheave is moved in one direction.

2. The combination with an arbor and guide-bars secured thereto and projecting laterally in both directions therefrom, of die carriers movable on said guide-bars, a sheave mounted to slide on the arbor, and devices carried by said sheave and coöperating with said carriers for opening and closing the same.

3. The combination with an arbor, die carriers movably mounted at one end thereof and provided with laterally projecting lugs, of a sheave mounted to slide on the arbor, wedge blocks attached to said sheave and coöperating with the lugs on the die carriers to open the latter, and cone or wedge pins also carried by said sheave and adapted to coöperate with the die carriers for closing them.

In testimony whereof, I have signed this specification in the presence of two subscribing witnesses.

JAMES A. BECHER.

Witnesses:
OTTO H. KOOTZ,
W. B. LARGENT.

---

Copies of this patent may be obtained for five cents each, by addressing the "Commissioner of Patents Washington, D. C."